United States Patent
Arai

(10) Patent No.: US 6,580,624 B2
(45) Date of Patent: Jun. 17, 2003

(54) SWITCHING POWER CIRCUIT WITH A FILTER FOR CONTROLLING NOISE OF A SWITCHING FREQUENCY AND METHOD OF SAME

(75) Inventor: Satoshi Arai, Tokyo (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 09/805,140

(22) Filed: Mar. 14, 2001

(65) Prior Publication Data

US 2001/0022737 A1 Sep. 20, 2001

(30) Foreign Application Priority Data

Mar. 5, 2000 (JP) ......................................... 2000-073177

(51) Int. Cl.$^7$ ............................................. H02M 3/355
(52) U.S. Cl. ........................................... 363/95; 363/40
(58) Field of Search ............................... 363/37, 39, 40, 363/95, 97, 98, 131, 132

(56) References Cited

U.S. PATENT DOCUMENTS 5,208,432 A * 5/1993 Han ..................... 219/10.55 B
5,451,750 A * 9/1995 An ............................. 219/716
5,640,310 A * 6/1997 Yasumura ..................... 363/19
5,644,480 A * 7/1997 Sako et al. .................... 363/17
6,072,291 A * 6/2000 Pedersen ..................... 318/362

OTHER PUBLICATIONS

Morio Sato, (Transistor Technique (CQ Publisher) "Power Harmonic Measure Technique and Design Example"), Apr. 1998, p. 321.

* cited by examiner

Primary Examiner—Adolf Deneke Berhane
(74) Attorney, Agent, or Firm—McGinn & Gibb, PLLC

(57) ABSTRACT

An AC power is rectified in a rectification circuit, and a pulsating voltage is output via a noise filter. The pulsating voltage is input to a switching circuit, and an AC voltage having a pulse width corresponding to a control signal is output. The AC voltage is transformed and rectified. The pulsating voltage is smoothed in a smoothing condenser, and a DC voltage is output. A voltage change detecting circuit detects a change of the DC voltage in a period longer than a period of ripple included in the DC voltage, and a detection signal is output. The detection signal is input to a control circuit, and a negative feed-back control is executed so that the DC voltage becomes constant.

7 Claims, 6 Drawing Sheets

SWITCHING POWER CIRCUIT WITH A FILTER FOR CONTROLLING NOISE OF A SWITCHING FREQUENCY AND METHOD OF SAME

BACKGROUND OF THE INVENTION

1. Field of the Invention

The present invention relates to a switching power circuit and a control method for the switching power circuit and more particularly relates to the switching power circuit for controlling a harmonic current of an AC (Alternating Current) power such as a commercial power and an external form of the switching power circuit is made small.

The present application claims priority of Japanese Patent Application No. 2000-073177 filed on Mar. 15, 2000, which is hereby incorporated by reference.

2. Description of the Related Art

A condenser-input switching power circuit rectifies an AC (Alternating Current) power such as a commercial power and smoothes the AC power with a condenser, and then converts the AC power into a predetermined DC voltage level with a DC—DC converter so as to keep an output voltage constant by a negative feedback control regardless of changes of an input voltage, a load and a like.

A conventional switching power circuit, as shown in FIG. 4, is provided with a rectification circuit 1, a smoothing condenser 2, a switching circuit 3, a transformer 4, a rectification circuit 5, a smoothing condenser 6, a voltage change detecting circuit 7 and a control circuit 8.

The rectification circuit 1 executes a full-wave (or half-wave) rectification to an AC power "in" such as a commercial power and outputs a first pulsating voltage.

The smoothing condenser 2 is an aluminum electrolytic condenser, and smoothes the first pulsating voltage so as to output a DC voltage V2.

The switching circuit 3 controls ON/OFF of the DC voltage V2 based on a given control signal CTA and outputs an AC voltage V3 having a pulse width corresponding to the control signal CTA at a predetermined frequency f (such as 20 kHz to 500 kHz).

The transformer 4 transforms the AC voltage V3 to a predetermined voltage, namely, an AC voltage V4.

The rectification circuit 5 rectifies the AC voltage V4 to a pulsating voltage V5.

The smoothing condenser 6 is an aluminum electrolytic condenser, and smoothes the pulsating voltage V5 so as to output a DC voltage V6 to a load not shown.

The voltage change detecting circuit 7 detects a change of the DC voltage V6 and outputs a detection signal V7.

The control circuit 8 gives the control signal CTA having a pulse width corresponding to the detection signal V7 to the switching circuit 3 at a predetermined frequency f.

In the switching power circuit, the AC voltage "in" is full-wave rectified in the rectification circuit 1, the first pulsating voltage is output and smoothed in the smoothing condenser 2, and then the DC voltage V2 is output. The DC voltage V2 is ON/OFF controlled in the switching circuit 3 based on the control signal CTA, and the AC voltage V3 of the pulse width corresponding to the control signal CTA at the predetermined frequency f is output.

The AC voltage V3 is transformed to the AC voltage V4 in the transformer 4, the AC voltage V4 is rectified in the rectification circuit 5 and the pulsating voltage V5 is output. The pulsating voltage V5 is smoothed in the smoothing condenser 6 and the DC voltage V6 is supplied to the load. Also, the change of the DC voltage V6 is detected in the voltage change detecting circuit 7 and the detection signal V7 is output. The detection signal V7 is input to the control circuit 8. When the level of the detection signal V7 is lower than a reference value, the pulse width of the control signal CTA is controlled so that a time of an ON state in the switching circuit 3 becomes long, and thereby the negative feedback control is executed so that the DC voltage V6 becomes constant. Also, when the level of the detection signal V7 is higher than the reference value, the pulse width of the control signal CTA is controlled so that the time of the ON state in the switching circuit 3 becomes short, and thereby the negative feedback control is executed so that the DC voltage V6 becomes constant.

However, there are following problems in the conventional switching power circuit.

FIG. 5A is a graph showing a voltage waveform Va of the AC power "in" and FIG. 5B is a graph showing a current waveform Ia of the AC power "in". In FIG. 5A, an axis of ordinates indicates a voltage value V and an axis of abscissas indicates a time t. In FIG. 5B, an axis of ordinates indicates a current value I and an axis of abscissas indicates a time t.

In the conventional switching power circuit, as shown in FIG. 5A and FIG. 5B, a large pulse current flows instantaneously near a peak of the voltage waveform (sine wave) Va caused by a peak of the current waveform Ia and an harmonic current flows at a side of the AC power "in". The harmonic current produces a harmful influence on the AC power "in", and therefore, there are problems in that a fault occurs in another electronic apparatus connected to the AC power "in" and a transmission loss becomes large. For example, when a video apparatus and an audio apparatus are commonly connected to the AC power "in" to which the switching power circuit is connected, there are harmful influences in that an image quality of the video apparatus and a tone quality of the audio apparatus deteriorate caused by the harmonic current. Therefore, a restriction is determined against the harmonic voltage at present.

Also, the switching power circuit is provided with the smoothing condenser 2 and the smoothing condenser 6 which are aluminum electrolytic condensers of comparatively large sizes, and therefore it is difficult to make an outside form of the switching power circuit small. Therefore, there is a problem in that the switching power circuit can not be installed in a small-size apparatus.

To solve these problems, a switching power circuit is proposed in which measures are taken against the harmonic voltage with an unique circuit configuration. The switching power circuit is discussed in "power harmonic measure technique and design example", written by Morio Sato, on page 321 of Transistor Technique (CQ Publisher), April 1998.

FIG. 6 is a circuit diagram showing an example of the switching power circuit discussed in this paper (Transistor Technique).

The switching power circuit, as shown in FIG. 6, is provided with a rectification circuit 11, a coil 12, a diode 13, a condenser 14, a condenser 15, an N-channel MOSFET (hereafter, called an NMOS) 16, a transformer 17, a diode 18, a coil 19, a diode 20 and a condenser 21. The condenser 15 and the condenser 20 are aluminum electrolytic condensers.

In the switching power circuit, when the NMOS 16 becomes OFF, a current indicated by a current rout L flows by a fly-back voltage which generates in a first coil 17a of the transformer 17, and the condenser 14 is charged. Then, when the NMOS 16 is turned ON, the condenser 14 is discharged. Since a discharge current rout M always passes through the AC power, the AC current is forcibly taken. As a result, a current flows also in a section in which a voltage between output ends of the rectification circuit 11 is lower than a voltage of the condenser 15. Therefore, a current flows also in a section though no current flows in the condenser-input switching power circuit, an conducting angle (namely, a period in which an AC current flows) enlarges and no harmonic current flows to the AC power "in". Further, since the coil 12 is excited by a current indicated by the discharge current rout M of the condenser 14, excited energy is discharged as a current indicated by a current rout N and the AC current is forcibly taken. Then, the excited energy moves from the condenser 14 to the coil 12 and the condenser 15. Then, the voltage of the condenser 15 is ON/OFF controlled by the NMOS 16, and an operation approximately similar to that of the switching power circuit shown in FIG. 4 is executed.

In the switching power circuit, the problem of the harmonic current at the side of the AC power "in" is solved. However, there are problems in that it is difficult to make an outside form small similarly to the switching power circuit shown in FIG. 4 and it is impossible to install the switching power circuit in a small apparatus, since parts are many in comparison with the switching power circuit shown in FIG. 4 and the condenser 15 and the condenser 21 are aluminum electrolytic condensers. In addition to the switching power circuit, though makers develop switching power circuits in which harmonic measures are taken by unique circuit configurations, those circuits have a problem in that circuits become complex and parts increase.

SUMMARY OF THE INVENTION

In view of the above, it is an object of the present invention to provide a switching power circuit and a control method for the switching power circuit which controls a harmonic current of an AC power and which is small in size.

According to a first aspect of the present invention, there is provided a switching power circuit including:
  a first rectification circuit for rectifying an AC (Alternating Current) power so as to generate a first pulsating voltage;
  a switching circuit for controlling ON/OFF of the first pulsating voltage based on a control signal which is input so as to generate a first AC voltage having a predetermined frequency higher than a frequency of the AC power and having a pulse width corresponding to the control signal;
  a transforming circuit for transforming the first AC voltage so as to generate a second AC voltage of a predetermined voltage value;
  a second rectification circuit for rectifying the second AC voltage so as to generate a second pulsating voltage;
  a smoothing circuit for smoothing the second pulsating voltage so as to generate a DC (Direct Current) voltage and for applying the DC voltage to a load;
  a voltage change detecting circuit for detecting a change of the DC voltage in a period longer than a period of a ripple included in the DC voltage so as to generate a detection signal; and
  a control circuit for generating the control signal used to execute a negative feed-back control of the pulse width of the first AC voltage based on a level of the detection signal.

In the foregoing, a preferable mode is one wherein the smoothing circuit is a condenser of which a volume per unit capacity is smaller than that of an aluminum electrolytic condenser.

Also, a preferable mode is one wherein the smoothing circuit is an electrical double layer condenser of which a volume per unit capacity is smaller than that of the aluminum electrolytic condenser.

Furthermore, a preferable mode is one wherein the voltage change detecting circuit includes:
  a reference voltage comparing section for comparing a level of the DC voltage with a reference voltage corresponding to a set value of the DC voltage and for outputting a comparison result signal; and
  a low-pass filter for receiving the comparison result signal and for passing only frequency components lower than the frequency of the ripple included in the DC voltage in the comparison result signal so as to output the frequency components as the detection signal.

According to a second aspect of the present invention, there is provided a control method for a switching power circuit including a first rectification circuit for rectifying an AC (Alternating Current) power so as to generate a first pulsating voltage, a switching circuit for controlling ON/OFF of the first pulsating voltage based on a control signal which is input so as to generate a first AC voltage having a predetermined frequency higher than a frequency of the AC power and having a pulse width corresponding to the control signal, a transforming circuit for transforming the first AC voltage so as to generate a second AC voltage of a predetermined voltage value, a second rectification circuit for rectifying the second AC voltage so as to generate a second pulsating voltage and a smoothing circuit for smoothing the second pulsating voltage so as to generate a DC (Direct Current) voltage and for applying the DC voltage to a load, the control method including:
  a voltage change detecting process of detecting a change of the DC voltage in a period longer than a period of a ripple included in the DC voltage so as to generate a detection signal; and
  a control signal generating process of generating the control signal used to execute a negative feed-back control for the pulse width of the first AC voltage based on a level of the detection signal.

In the foregoing, a preferable mode is one where in the voltage change detecting process includes:
  a reference voltage comparing process of comparing a level of the DC voltage with a reference voltage corresponding to a set value of the DC voltage and of outputting a comparison result signal; and
  a low-pass process of passing only frequency components lower than the frequency of the ripple included in the DC voltage in the comparison result signal so as to output the frequency components as the detection signal.

With this configuration, since there is no smoothing condenser at a rear step of the first rectification circuit, it is possible to control a harmonic current flowing to the AC power with a simple configuration and it is possible to make an outside form of the switching power circuit small. Therefore, when a video apparatus, an audio apparatus, and a like are commonly connected to the AC power to which the switching power circuit is connected, it is possible to avoid deterioration of an image quality of the video apparatus and a tone quality of the audio apparatus. Also, since the smoothing circuit is an electronic double layer condenser, it is possible to make the switching power circuit smaller than a conventional switching power circuit using an aluminum electrolytic condenser, and therefore it is possible to install the switching power circuit into a smaller apparatus. Furthermore, since the voltage change detecting circuit is not responsive to the ripple components included in the DC voltage, a change of the DC voltage of a frequency lower than a frequency of the ripple included in the DC voltage is detected and an output current supplied to the load can be proportional to the DC voltage.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using an embodiment with reference to the accompanying drawings.

Figure 1:
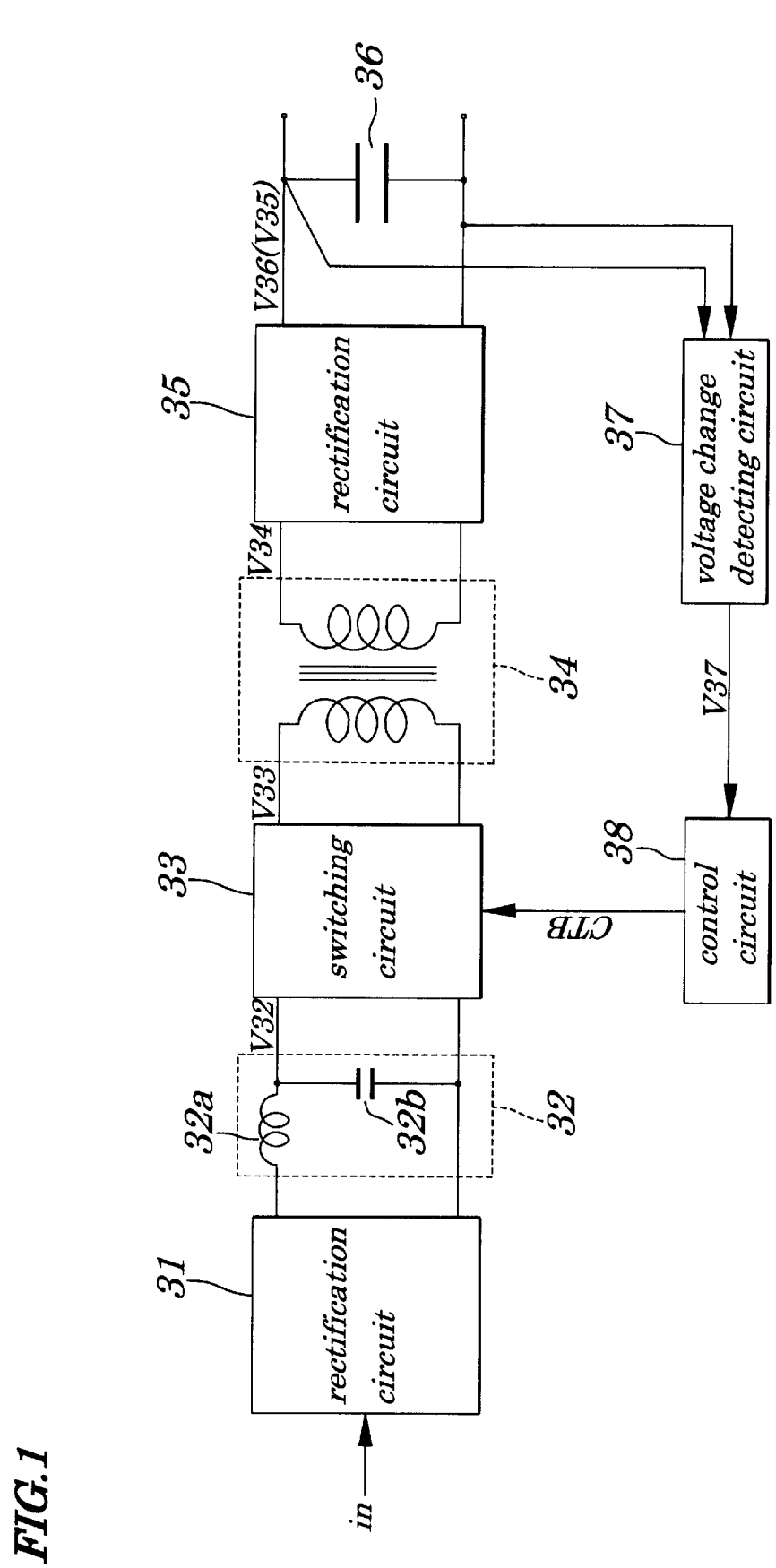
FIG. 1 is a block diagram showing an electrical configuration of a switching power circuit according to an embodiment of the present invention.

FIG. 1 is a block diagram showing an electrical configuration of a switching power circuit according to an embodiment of the present invention.

The switching power circuit, as shown in FIG. 1, is provided with a first rectification circuit 31, a noise filter 32, a switching circuit 33, a transforming circuit (such as a transformer) 34, a second rectification circuit 35, a smoothing circuit 36, a voltage change detecting circuit 37 and a control circuit 38.

The first rectification circuit 31 rectifies an AC power "in" and outputs a first pulsating voltage V32.

The noise filter 32 is an LC filter including a coil 32a and a condenser 32b and controls a noise of a switching frequency in the switching circuit 33.

The switching circuit 33 is a switching element such as a MOSFET and controls ON/OFF of the first pulsating voltage based on a given control signal CTB so as to output a first AC voltage V33 having a predetermined frequency (such as 20 kHz to 500 kHz) and having a pulse width corresponding to the control signal CTB.

The transforming circuit 34 transforms the first AC voltage V33 so as to generate a second AC voltage V34 of a predetermined voltage.

The second rectification circuit 35 rectifies the second AC voltage V34 and outputs a second pulsating voltage V35.

The smoothing circuit 36 has a predetermined capacity value, is an electrical double layer condenser of which a volume per unit capacity is smaller than that of an aluminum electrolytic condenser and smoothes the second pulsating voltage V35 so as to output a DC voltage V36 to a load not shown. The electrical double layer condenser has a characteristic capable of smoothing the second pulsating voltage V35 sufficiently at a frequency of 100 Hz or 120 Hz. For example, when a wave value of ripple components included in the DC voltage V36 is controlled under 1% of the DC voltage V36, an impedance of the electrical double layer condenser is set under 1% of a load impedance.

The voltage change detecting circuit 37 detects a change of the DC voltage V36 in a period longer than a period of the ripple included in the DC voltage v36 and outputs a detection signal V37. When the voltage change detecting circuit 37 detects ripple components included in the DC voltage V36, the DC voltage V36 is controlled in accordance with the ripple components, and thereby an output current supplied to the load is not proportional to the DC voltage V36. Therefore, the voltage change detecting circuit 37 is not responsive to the ripple components included in the DC voltage V36.

The control circuit 38 generates the control signal CTB for a negative feedback control of a pulse width of the first AC voltage V33 based on the level of the detection signal V37.

Figure 2:
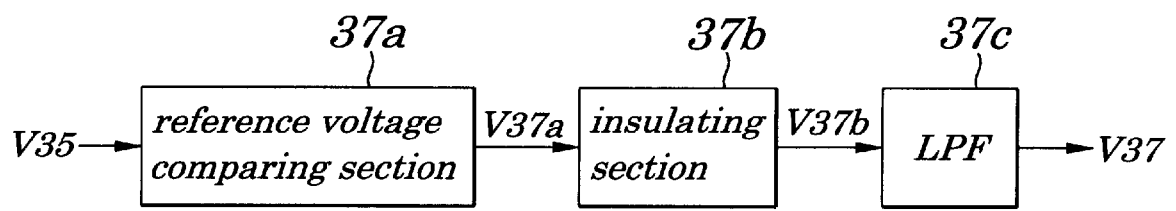
FIG. 2 is a block diagram showing an electrical configuration of a voltage change detecting circuit in FIG. 1.

FIG. 2 is a block diagram showing an electrical configuration of the voltage change detecting circuit 37 shown in FIG. 1.

The voltage change detecting circuit 37 is provided with a reference voltage comparing section 37a, an insulating section 37b and a LPF (Low Pass Filter) 37c.

The reference voltage comparing section 37a compares the DC voltage V36 with a reference voltage corresponding to a set value of the DC voltage V36 and outputs a comparison result signal V37a.

The insulating section 37b is a photo coupler and transmits the comparison result signal V37a in an electrical insulating state so as to output a comparison result signal V37b.

The LPF 37c receives the comparison result signal V37b and passes only frequency components lower than the frequency of the ripple included in the DC voltage V36 in the comparison result signal V37a. For example, when a frequency of the AC power "in" is 50 Hz and the first rectification circuit 31 is a full-wave rectification circuit, a frequency of the ripple included in the DC voltage V36 is 100 Hz, and therefore, a cut-off frequency of the LPF 37c is set to a frequency lower than 100 Hz (such as 10 Hz).

Figure 3A:
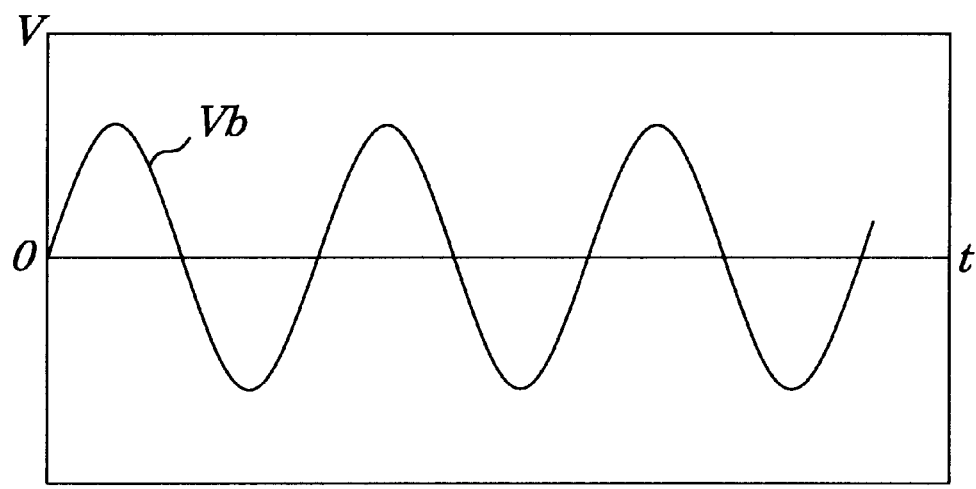
FIG. 3A and FIG. 3B are graphs showing a voltage waveform Vb and a current waveform Ib of an AC power "in" according to the embodiment of the present invention.
Figure 3B:
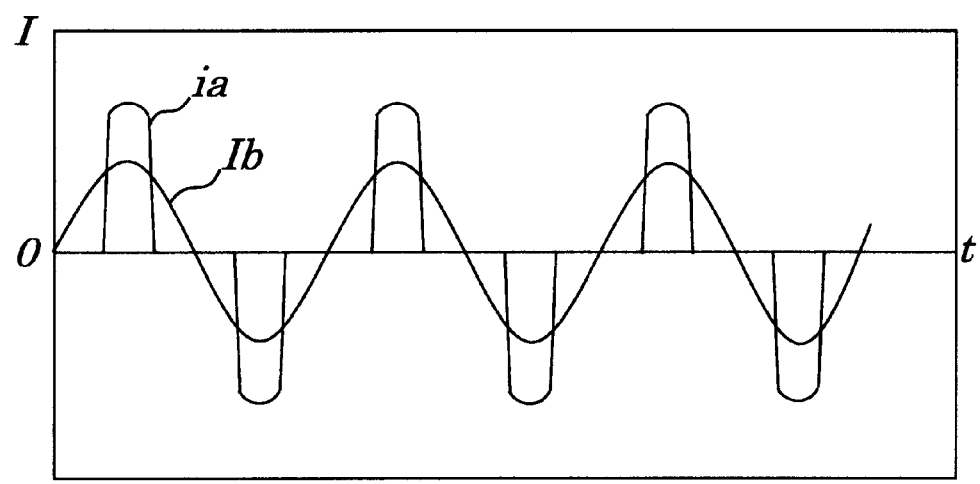
Figure 4:
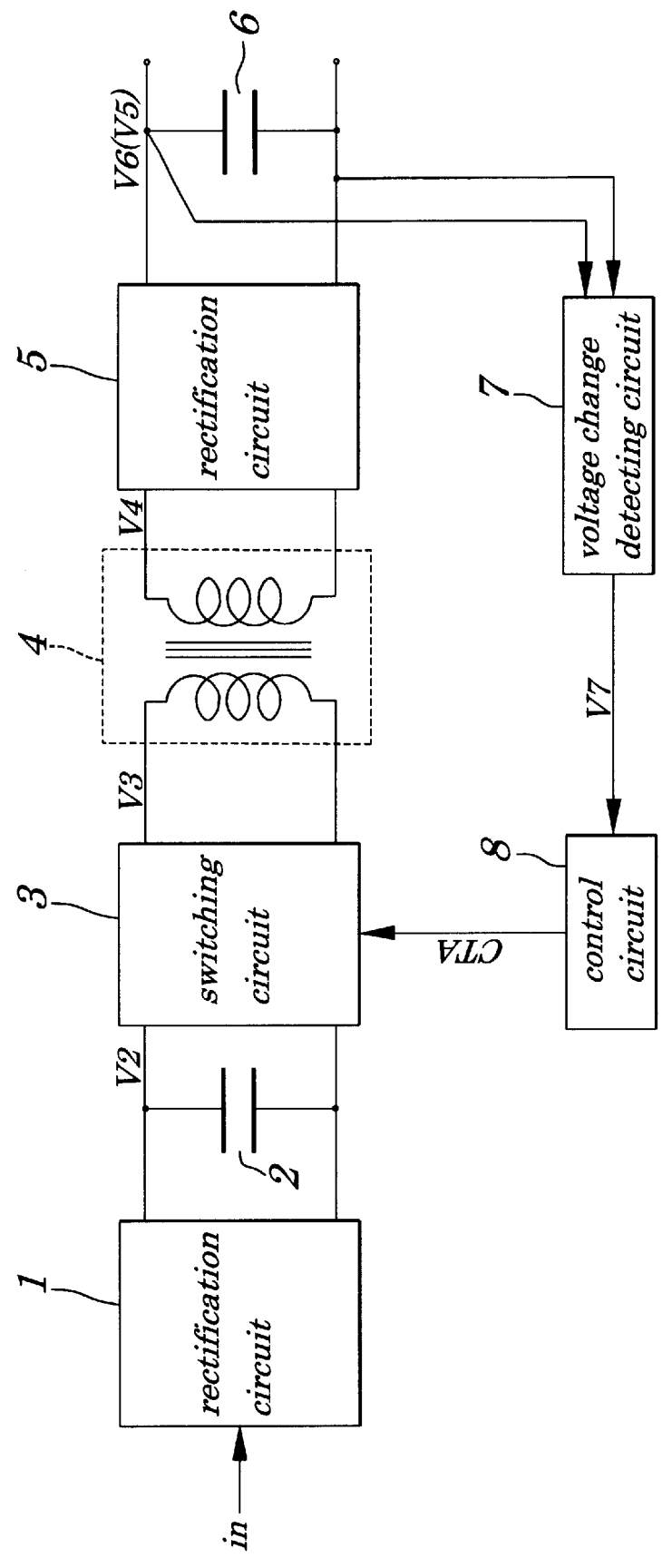
FIG. 4 is a block diagram showing an electrical configuration of a conventional switching power circuit.

FIG. 3A is a graph showing a voltage waveform Vb of the AC power "in" shown in FIG. 1 and FIG. 3B is a graph showing a current waveform Ib of the AC power "in". In FIG. 3A, an axis of ordinates indicates a voltage value V and an axis of abscissas indicates a time t. In FIG. 3B, an axis of ordinates indicates a current value I and an axis of abscissas indicates a time t.

An operation of the switching power circuit according to the embodiment will be explained with reference to FIG. 1 to FIG. 3B.

The AC power "in" is full-wave rectified in the first rectification circuit 31 and the first pulsating voltage V32 is output. The first pulsating voltage V32 is transmitted via the noise filter 32, and the pulsating voltage V32 is output from the noise filter 32. The first pulsating voltage V32 is ON/OFF controlled in the switching circuit 33 based on the control signal CTB, and thereby the first AC voltage V33 having a pulse width corresponding to the control signal CTB and having a frequency f is output. The first AC voltage V33 is transformed to the second AC voltage V34 in the transforming circuit 34, the second AC voltage V34 is rectified in the second rectification circuit 35, and then the second pulsating voltage V35 is output. The second pulsating voltage V35 is smoothed in the smoothing condenser 36 and the DC voltage V36 is supplied to the load. Also, in the voltage change detecting circuit 37, a change of the DC voltage V36 is detected during a period longer than a ripple period included in the DC voltage V36 and the detection signal V37 is output (voltage change detecting process).

In this case, the DC voltage V36 is compared with the reference voltage in the reference voltage comparing section 37a, and the comparison result signal V37a is output from the reference voltage comparing section 37a (reference voltage comparing process). The comparison result signal V37a is input to the insulating section 37b, and the comparison result signal V37b is output from the insulating section 37b. Concerning the comparison result signal V37b, in the LPF 37c, frequency components of the ripple included in the DC voltage V36 are eliminated, and the detection signal V37 including only frequency components lower than the frequency of the ripple included in the DC voltage V36 is output from the LPF 37c (low-pass process). The detection signal V37 is input to the control circuit 38. When the level of the detection signal V37 is lower than a reference value, the pulse width of the control signal CTB is controlled so that an ON state of the switching circuit 33 becomes longer and a negative feedback control is executed so that the DC voltage V36 becomes constant. Also, when the level of the detection signal V37 is higher than the reference value, the pulse width of the control signal CTB is controlled so that an ON state of the switching circuit 33 becomes shorter and a negative feedback control is executed so that the DC voltage V36 becomes constant (control signal generating process).

Figure 5A:
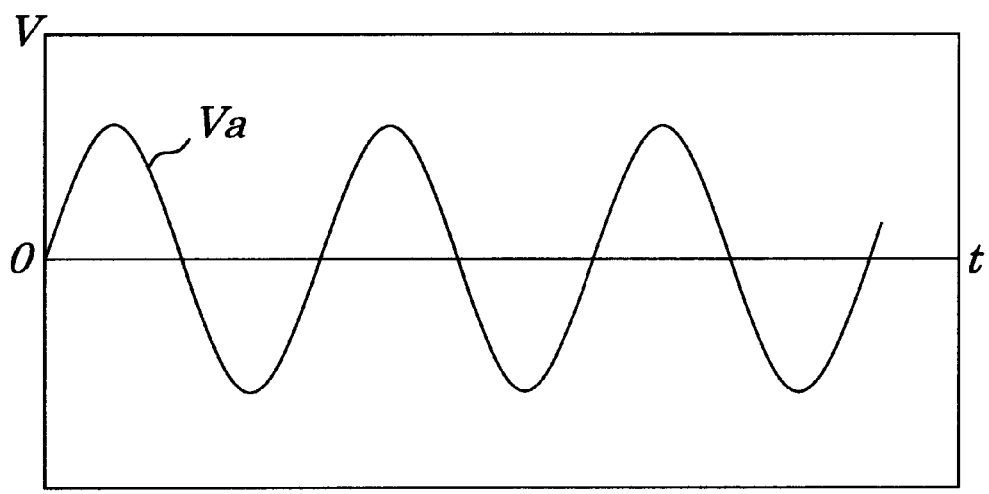
FIG. 5A and FIG. 5B are graphs showing a voltage waveform Va and a current waveform Ia of an AC power "in" in FIG. 4.
Figure 5B:
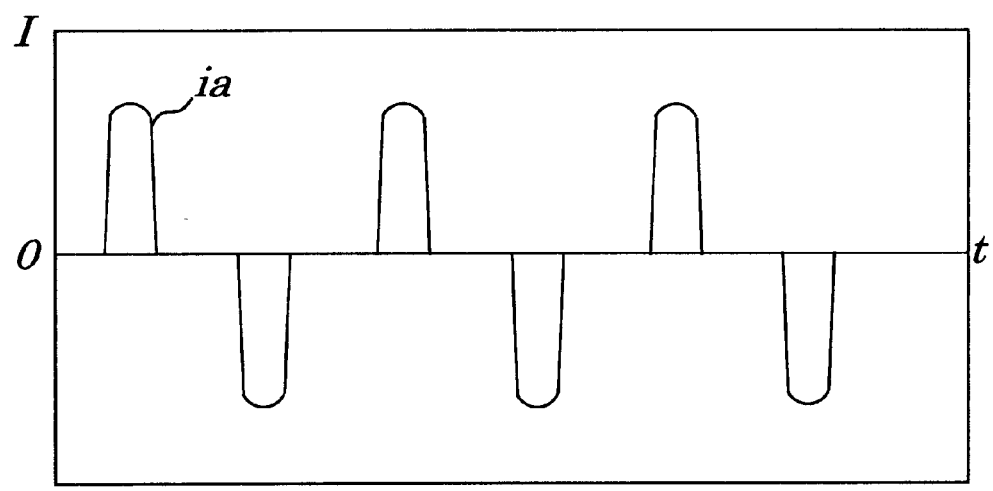
Figure 6:
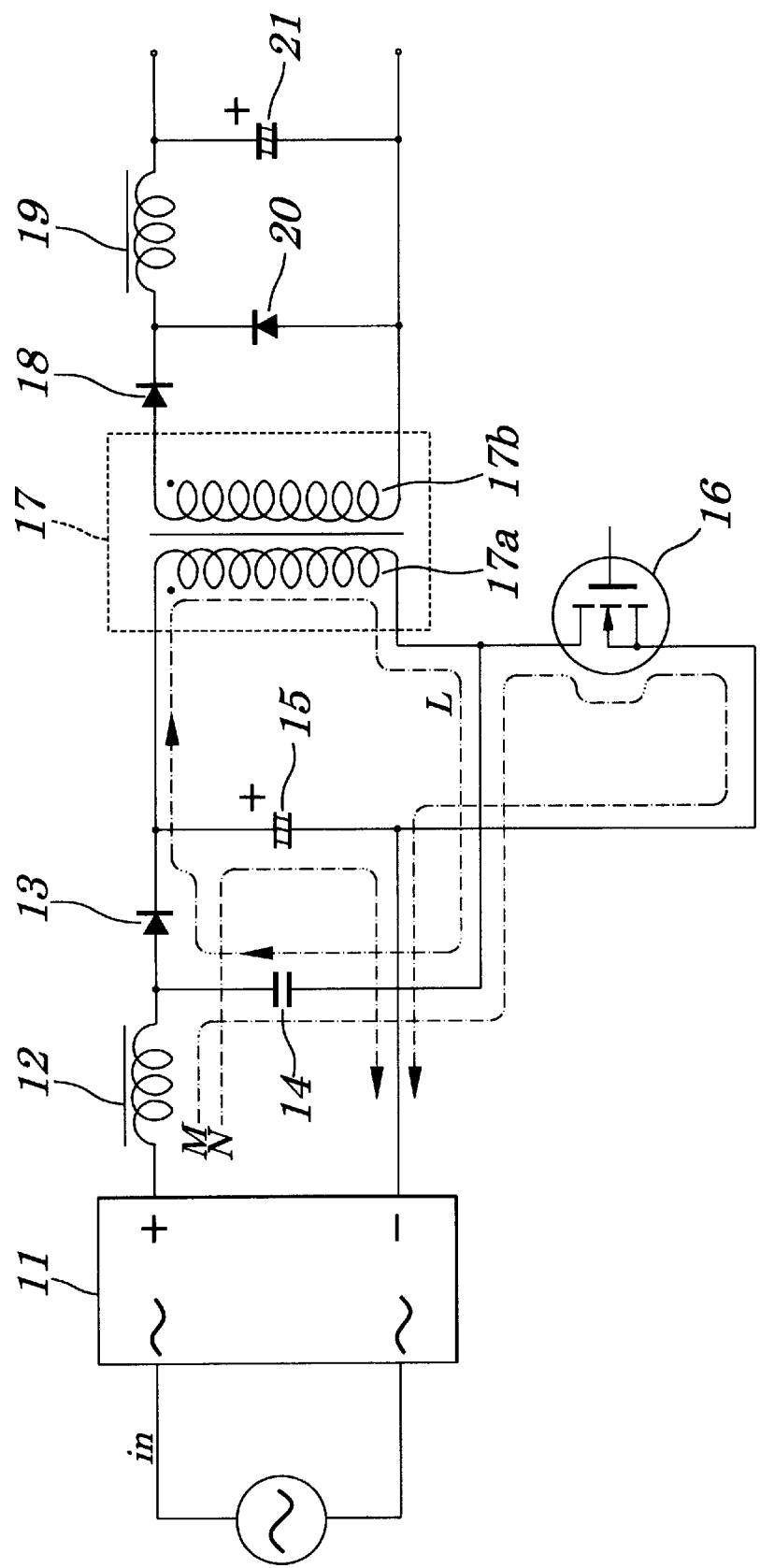
FIG. 6 is a block diagram showing an electrical configuration of another conventional switching power circuit.

In the switching power circuit, since there is no smoothing condenser at a rear step of the first rectification circuit 31, as shown in FIG. 3A and in FIG. 3B, the current waveform Ib and the voltage waveform Vb become a same sine waveform and there is no peak like the current waveform Ia (FIG. 5B). As a result, no harmonic current flows to the AC power "in".

As described above, in the embodiment, since there is no smoothing condenser at a rear step of the first rectification circuit 31, a harmonic current flowing to the AC power "in" is restricted with a simple configuration and an outside form becomes small. Therefore, when a video apparatus and an audio apparatus are commonly connected to the AC power "in" to which the switching power circuit is connected, it is possible to avoid deterioration of an image quality of the video apparatus and an tone quality of the audio apparatus. Further, since the smoothing circuit 36 is an electrical double layer condenser, the outside form of the switching power circuit can be made smaller than the conventional switching power circuit using an aluminum electrolytic condenser. As a result, it is possible to install the switching power circuit in a small apparatus. Additionally, since the voltage change detecting circuit 37 is not responsive to ripple components included in the DC current V36, a change of the DC voltage V36 of the frequency lower than the frequency of the ripple included in the DC voltage V36 is detected and the output current supplied to the load can be proportional to the DC voltage V36.

It is apparent that the present invention is not limited to the above embodiments but may be changed and modified without departing from the scope and spirit of the invention.

For example, the AC power "in" is not limited to commercial power and, for example, an AC power output from a private power generator may be used. The smoothing circuit 36 is not limited to an electrical double layer condenser and when a condenser of which a volume per unit capacity is smaller than that of the aluminum electrolytic condenser is developed, the condenser may be used.

Furthermore, a rush current restricting section such as a resistor may be added between the second rectification circuit 35 and the smoothing circuit 36 and the second pulsating voltage V35 may be supplied to the smoothing circuit 36 via the rush current restricting section.

What is claimed is:

1. A switching power circuit, comprising:
   a first rectification circuit for rectifying an alternating current power so as to generate a first pulsating voltage;
   a noise filter for controlling a noise of a switching frequency, said noise filter including a coil and a condenser configured as an LC filter connected across said first pulsating voltage,
      wherein said condenser is other than a smoothing condenser connected directly to said first rectification circuit;
   a switching circuit for controlling ON/OFF of said first pulsating voltage based on a control signal which is input so as to generate a first alternating current voltage having a predetermined frequency higher than a frequency of said alternating current power and having a pulse width corresponding to said control signal;
   a transforming circuit for transforming said first alternating current voltage so as to generate a second alternating current voltage of a predetermined voltage value;
   a second rectification circuit for rectifying said second alternating current voltage so as to generate a second pulsating voltage;
   a smoothing circuit for smoothing said second pulsating voltage so as to generate a direct current voltage and for applying said direct current voltage to a load,
      wherein said smoothing circuit comprises an electrical double layer condenser of which a volume per unit capacity is smaller than that of an aluminum electrolytic condenser, and of which an impedance is set under 1% of a load impedance;
   a voltage change detecting circuit for detecting a change of said direct current voltage in a period longer than a period of a ripple included in said direct current voltage so as to generate a detection signal; and
   a control circuit for generating said control signal used to execute a negative feed-back control of said pulse width of said first alternating current voltage based on a level of said detection signal.

2. The switching power circuit according to claim 1, wherein said voltage change detecting circuit comprises:
   a reference voltage comparing section for comparing a level of said direct current voltage with a reference voltage corresponding to a set value of said direct current voltage and for outputting a comparison result signal; and
   a low-pass filter for receiving said comparison result signal and for passing only frequency components lower than a frequency of said ripple included in said direct current voltage in said comparison result signal so as to output said frequency components as said detection signal.

3. The switching power circuit according to claim 1, wherein said voltage change detecting circuit, comprises:

a reference voltage comparing section for comparing a level of said direct current voltage with a reference voltage corresponding to a set value of said direct current voltage and for outputting a comparison result signal; and a low-pass filter for receiving said comparison result signal and for passing only frequency components lower than a frequency of said ripple included in said direct current voltage in said comparison result signal so as to output said frequency components as said detection signal.

4. A control method for a switching power circuit comprising a first rectification circuit for rectifying an alternating current power so as to generate a first pulsating voltage, a switching circuit for controlling ON/OFF of said first pulsating voltage based on a control signal which is input so as to generate a first alternating current voltage having a predetermined frequency higher than a frequency of said alternating current power and having a pulse width corresponding to said control signal, a transforming circuit for transforming said first alternating current voltage so as to generate a second alternating current voltage of a predetermined voltage value, a second rectification circuit for rectifying said second alternating current voltage so as to generate a second pulsating voltage and a smoothing circuit for smoothing said second pulsating voltage so as to generate a direct current voltage, in which said smoothing circuit comprises an electrical double layer condenser of which a volume per unit capacity is smaller than that of an aluminum electrolytic condenser, and for applying said DC voltage to a load, and of which an impedance is set under 1% of a load impedance, said control method comprising:

a noise controlling process of controlling a noise of a switching frequency by a noise filter including a coil and a condenser configured as an LC filter connected across said first pulsating voltage,
wherein said condenser is other than a smoothing condenser connected directly to said first rectification circuit;

a voltage change detecting process of detecting a change of said direct current voltage in a period longer than a period of a ripple included in said direct current voltage so as to generate a detection signal; and a control signal generating process of generating said control signal used to execute a negative feed-back control for said pulse width of said first alternating current voltage based on a level of said detection signal.

5. The control method according to claim 4, wherein said voltage change detecting process comprises:

a reference voltage comparing process of comparing a level of said direct current voltage with a reference voltage corresponding to a set value of said direct current voltage and of outputting a comparison result signal; and a low-pass process of passing only frequency components lower than a frequency of said ripple included in said DC voltage in said comparison result signal so as to output said frequency components as said detection signal.

6. The control method according to claim 4, wherein said voltage chan e detecting process detects said change of said direct current voltage in a period longer than a period of a ripple included in said direct current voltage so as to generate said detection signal.

7. A switching power circuit, comprising:

a first rectification circuit for rectifying an alternating current power so as to generate a first pulsating voltage;

a switching circuit for controlling ON/OFF of said first pulsating voltage based on a control signal which is input so as to generate a first alternating current voltage having a predetermined frequency higher than a frequency of said alternating current power and having a pulse width corresponding to said control signal;

a transforming circuit for transforming said first alternating current voltage so as to generate a second alternating current voltage of a predetermined voltage value;

a second rectification circuit for rectifying said second alternating current voltage so as to generate a second pulsating voltage;

a smoothing circuit for smoothing said second pulsating voltage so as to generate a direct current voltage and for applying said direct current voltage to a load,
wherein said smoothing circuit comprises an electrical double layer condenser of which a volume per unit capacitance is smaller than that of an aluminum electrolytic condenser, and of which an impedance is set under 1% of a load impedance;

a voltage change detecting circuit for detecting a change of said direct current voltage in a period longer than a period of a ripple included in said direct current voltage so as to generate a detection signal; and a control circuit for generating said control signal used to execute a negative feed-back control of said pulse width of said first alternating current voltage based on a level of said detection signal.

* * * * *